(12) United States Patent
Burque

(10) Patent No.: US 9,301,518 B1
(45) Date of Patent: Apr. 5, 2016

(54) ELECTRICALLY SWIVELED HUNTER CHAIR DEVICE

(71) Applicant: James J. Burque, Circle Pines, MN (US)

(72) Inventor: James J. Burque, Circle Pines, MN (US)

(*) Notice: Subject to any disclaimer, the term of this patent is extended or adjusted under 35 U.S.C. 154(b) by 111 days.

(21) Appl. No.: 14/471,297

(22) Filed: Aug. 28, 2014

(51) Int. Cl.
*A01M 31/02* (2006.01)
*A47C 1/14* (2006.01)
*A47C 3/18* (2006.01)
*A47C 7/54* (2006.01)

(52) U.S. Cl.
CPC .................. *A01M 31/02* (2013.01); *A47C 1/14* (2013.01); *A47C 3/18* (2013.01); *A47C 7/54* (2013.01)

(58) Field of Classification Search
CPC ....... A01K 97/00; A01K 99/00; A01M 31/00; A01M 31/02
USPC ............ 297/344.23, 344.12, 334.21, 330, 45; 296/65.03; 114/363; 43/1, 4
See application file for complete search history.

(56) References Cited

U.S. PATENT DOCUMENTS

| 3,736,897 | A | * | 6/1973 | Krutz | B63B 29/04 114/363 |
|---|---|---|---|---|---|
| 4,008,500 | A | * | 2/1977 | Hall, Jr. | B63B 29/04 114/363 |
| 4,516,805 | A | * | 5/1985 | Leeper | A47C 1/0244 297/188.07 |
| 4,696,374 | A | | 9/1987 | Hale | |
| 4,722,706 | A | * | 2/1988 | Young | B63B 29/04 114/153 |
| 4,766,838 | A | * | 8/1988 | Johnson | B63B 29/04 114/363 |
| 4,879,963 | A | * | 11/1989 | Dionne | B63B 29/04 114/363 |
| 5,346,415 | A | * | 9/1994 | Waymon | B63B 29/06 114/363 |
| 5,364,163 | A | * | 11/1994 | Hardison | A47C 3/18 297/344.21 |
| 5,647,161 | A | * | 7/1997 | Miller, Sr. | B63B 29/04 114/363 |
| 5,775,251 | A | * | 7/1998 | Morningstar | B63B 29/06 114/363 |
| 5,795,017 | A | * | 8/1998 | Zimmerman | B63B 29/04 297/15 |
| 6,012,775 | A | * | 1/2000 | Czarnecki | A47C 3/30 297/344.13 |
| 6,082,680 | A | * | 7/2000 | Woodward | B63B 29/06 114/363 |
| 6,086,142 | A | * | 7/2000 | Simmons | B60N 2/146 296/190.01 |
| 6,089,652 | A | * | 7/2000 | Miller, Sr. | A01K 97/00 297/326 |
| 6,098,937 | A | * | 8/2000 | Carnahan | A47C 3/02 248/158 |
| 6,116,183 | A | * | 9/2000 | Crow | A47C 15/004 114/363 |
| 6,386,635 | B1 | * | 5/2002 | Ralph | B60N 2/502 297/314 |
| 6,431,109 | B1 | * | 8/2002 | Martin | B63B 29/04 114/363 |

(Continued)

*Primary Examiner* — David R Dunn
*Assistant Examiner* — Timothy J Brindley
(74) *Attorney, Agent, or Firm* — Crossley Patent Law (57) ABSTRACT

An electrically swiveled hunter chair device having a chair affixed to a base, a receiver disposed on the base, a cylinder selectively and rotatably disposed within the receiver, a motor drive in operational communication with the chair such that the chair is bidirectionally rotated via a foot pedal, the chair further having folding spikes whereby chair removal provides for anchoring the chair to a ground, the chair height adjustable via a selectively inserted pin, the device selectively mounted to any imaginable surface including various vehicles.

2 Claims, 8 Drawing Sheets

(56) References Cited

U.S. PATENT DOCUMENTS

| | | | |
|---|---|---|---|
| 6,435,614 B1 * | 8/2002 | Gollahon | A01K 97/10 248/393 |
| 6,439,635 B1 | 8/2002 | Hardy et al. | |
| 6,591,540 B1 * | 7/2003 | Chargois | A01K 97/10 224/922 |
| D512,576 S * | 12/2005 | Szyperski | D6/368 |
| 7,331,305 B2 * | 2/2008 | Garelick | B63B 29/04 114/363 |
| 7,882,795 B1 * | 2/2011 | Snyder | B63B 29/04 114/363 |
| 8,146,993 B2 * | 4/2012 | Schneider | B60N 2/24 297/273 |
| 8,465,090 B1 * | 6/2013 | O'Connor | A47C 7/62 297/184.16 |
| 8,845,560 B1 * | 9/2014 | Hernandez | A61H 1/005 297/338 |
| 8,936,315 B2 * | 1/2015 | Fienup | A61B 3/024 297/330 |
| 2002/0149249 A1 * | 10/2002 | Horn | B60N 2/0292 297/344.12 |
| 2003/0209931 A1 * | 11/2003 | Glaser | A47C 3/18 297/344.12 |
| 2005/0274573 A1 | 12/2005 | Smith | |
| 2007/0216209 A1 * | 9/2007 | Kuenzel | A47C 3/30 297/344.12 |
| 2008/0179923 A1 * | 7/2008 | Lake | A47D 1/008 297/148 |
| 2009/0184545 A1 * | 7/2009 | Jones | B60N 2/502 297/216.1 |
| 2010/0164259 A1 * | 7/2010 | Bellvis Castillo | A47C 9/025 297/195.11 |
| 2012/0212013 A1 | 8/2012 | Ripley et al. | |
| 2014/0103691 A1 * | 4/2014 | Boyd | A47C 9/007 297/344.18 |
| 2015/0283928 A1 * | 10/2015 | Bauman | B63B 29/04 297/344.12 |

* cited by examiner

ELECTRICALLY SWIVELED HUNTER CHAIR DEVICE

BACKGROUND OF THE INVENTION

Various types of hunter chair device are known in the prior art. Many such chairs feature scissor type lifting capability, yet a significantly elevated chair is not always desirable, especially when safety is a concern. Most offered are substantially permanent mount, whether to ATV's or other vehicles. And, none offer instant chair removal such that the chair itself might be used in varying circumstances, such as around a campfire. None noted offer electrically operated swiveling. What is needed is electrically swiveled hunter chair device that solves these problems.

FIELD OF THE INVENTION

The present invention relates to hunter chair device, and more particularly, to an electrically swiveled hunter chair device.

SUMMARY OF THE INVENTION

The general purpose of the electrically swiveled hunter chair device, described subsequently in greater detail, is to provide an electrically swiveled hunter chair device that has many novel features that result in an electrically swiveled hunter chair device which is not anticipated, rendered obvious, suggested, or even implied by prior art, either alone or in combination thereof.

To accomplish this, an electrically swiveled hunter chair device is provided. The device comprises a chair affixed to a base. A receiver is disposed on the base. A pair of folding armrests is disposed on the chair. An accessory tube is disposed on the chair and welcomes the selective receipt of an umbrella or other desired item. A plurality of pouches is disposed on the chair as a convenience. A harness is disposed on the chair as both a safety and convenience item, as the chair may see transport across rugged terrain. A plurality of folding spikes is disposed on the base.

A motor is selectively disposed on the base. A drive gear is affixed to the motor. A slave gear is selectively disposed on the receiver. The slave gear is keyed and therefore engaged when installed. Removability of the slave gear and the motor enables ease of use of the chair on a ground. A bidirectional foot pedal is in operational communication with the motor and provides for controlling the chair in bidirectional rotation. An electrical feed is connected to the foot pedal. A cylinder is selectively disposed within the receiver. The spikes enable the chair to be anchored to ground when selectively removed from the cylinder, thereby enabling the chair to enjoy double functionality. A plurality of holes is disposed in the cylinder. A tube is provided. The tube has a first end spaced apart from a second end. The first end is in slidable receipt of the cylinder. A plurality of foramen is disposed within the tube. A pin selectively secures the cylinder within the tube via the holes and the foramen. The plurality of holes and foramen provide for easy height adjustment of the chair.

A mount is disposed on the second end. A platform is provided. The platform has a top side spaced apart from a bottom side. The top side is removably affixed to the mount. This removable joining of the mount to the platform enables partial disassembly of the device. A plurality of folding spikes is affixed to the bottom side. With the platform spikes, the entire platform is selectively anchored to ground. A threaded retainer is provided. A plurality of fasteners is selectively passed through the platform and into the threaded retainer. An existing object is selectively disposed between the platform and the threaded retainer in removably fastening the device to the object. The threaded retainer is important in that no reach or accessibility problems are encountered in mounting and dismounting the device, and no loose nuts have to be dealt with.

The device is readily fastened to an ATV, a trailer, a truck, and any number of other transport and even stationary objects and vehicles.

Thus has been broadly outlined the more important features of the present electrically swiveled hunter chair device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 8 thereof, an example of the electrically swiveled hunter chair device employing the principles and concepts of the present electrically swiveled hunter chair device and generally designated by the reference number 10 will be described.

Referring to FIGS. 1 through 8, the electrically swiveled hunter chair device 10 comprises a chair 20 affixed to a base 22. A receiver 23 is disposed on the base 22. A pair of folding armrests 24 is disposed on the chair 20. An accessory tube 26 is disposed on the chair 20. A plurality of pouches 28 is disposed on the chair 20. A harness 30 is disposed on the chair 20. A plurality of folding spikes 66 is disposed on the base 22.

A motor 32 is selectively disposed on the base 22. A drive gear 34 is affixed to the motor 32. A slave gear 36 is selectively disposed on the receiver 23. A bidirectional foot pedal 38 is in operational communication with the motor 32. The foot pedal 38 provides bidirectional drive of the motor 32, thereby enabling bidirectional rotation of the chair 20. An electrical feed 39 is connected to the foot pedal 38. A cylinder 40 is selectively disposed within the receiver 23. A plurality of holes 48 is disposed in the cylinder 40. A tube 50 is provided. The tube 50 has a first end 52 spaced apart from a second end 54. The first end 52 is in slidable receipt of the cylinder 40. A plurality of foramen 56 is disposed within the tube 50. A pin 58 selectively secures the cylinder 40 within the tube 50 via the holes 48 and the foramen 56.

A mount 60 is disposed on the second end 54. A platform 62 is provided. The platform 62 has a top side 64 spaced apart from a bottom side 65. The top side 64 is affixed to the mount 60. A plurality of folding spikes 66 is affixed to the bottom side 65. A threaded retainer 68 is provided. A plurality of fasteners 70 is selectively passed through the platform 62 and into the threaded retainer 68. An existing object is selectively disposed between the platform 62 and the threaded retainer 68 in selectively fastening the device 10 to the object.

Figure 1:
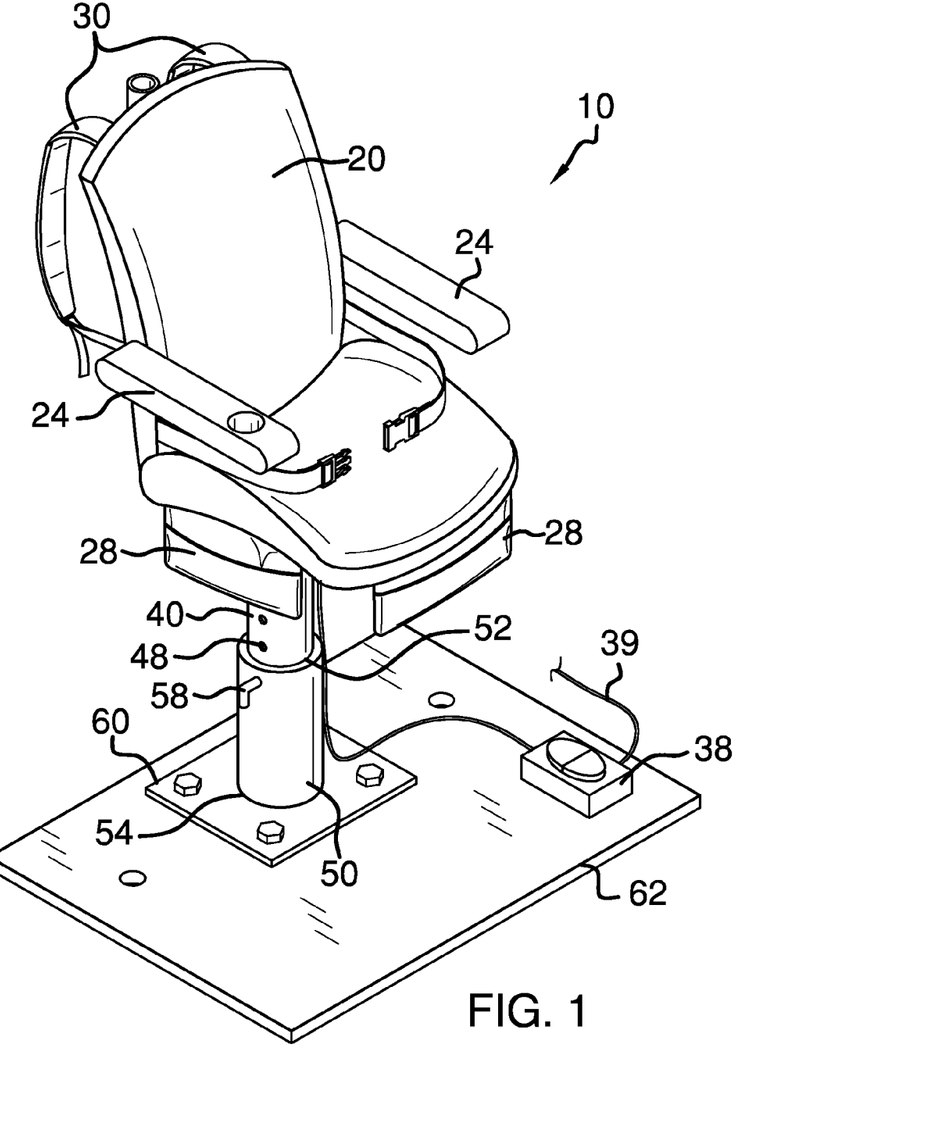
FIG. 1 is a perspective view.
Figure 2:
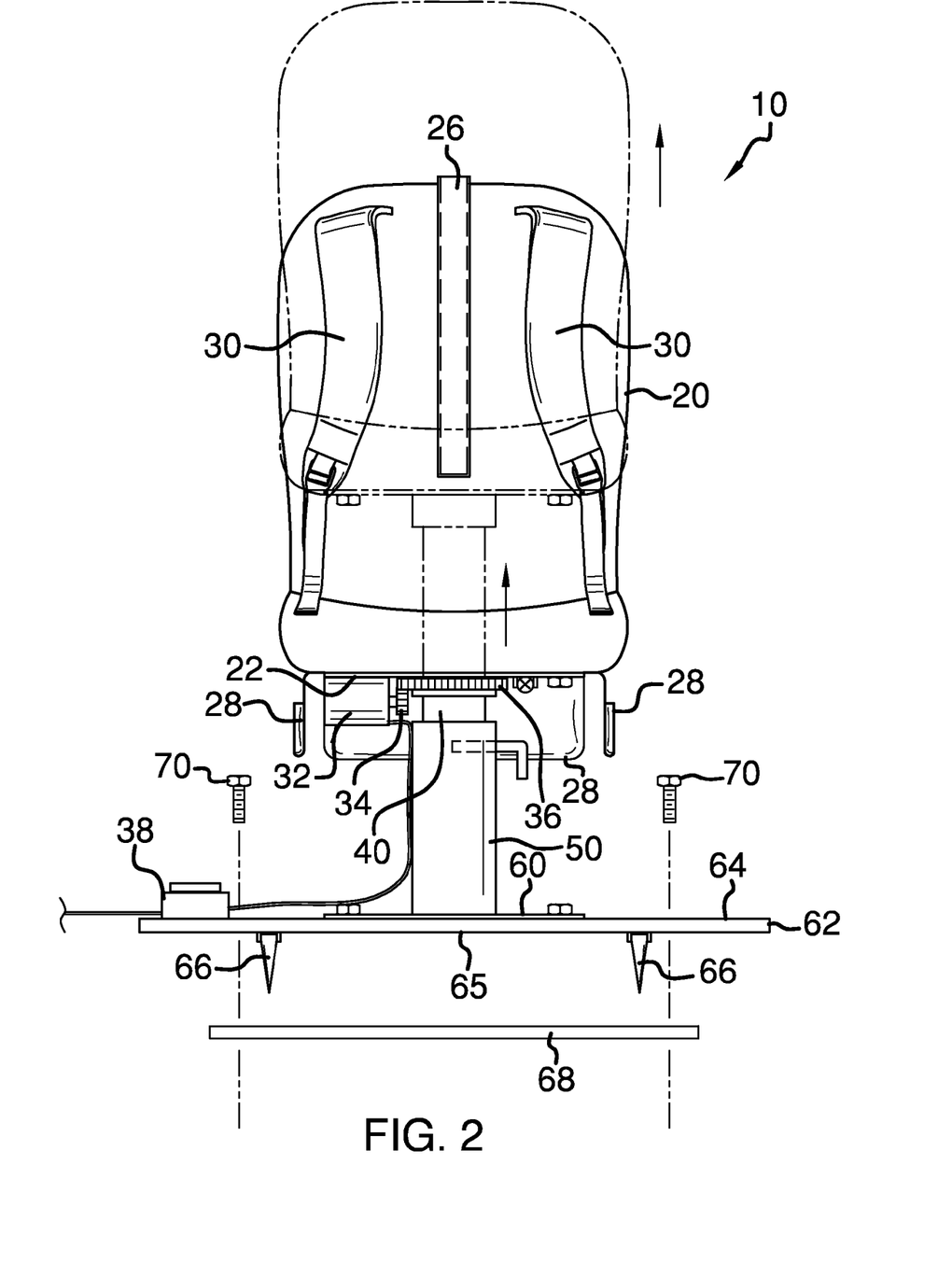
FIG. 2 is a rear elevation view.
Figure 3:
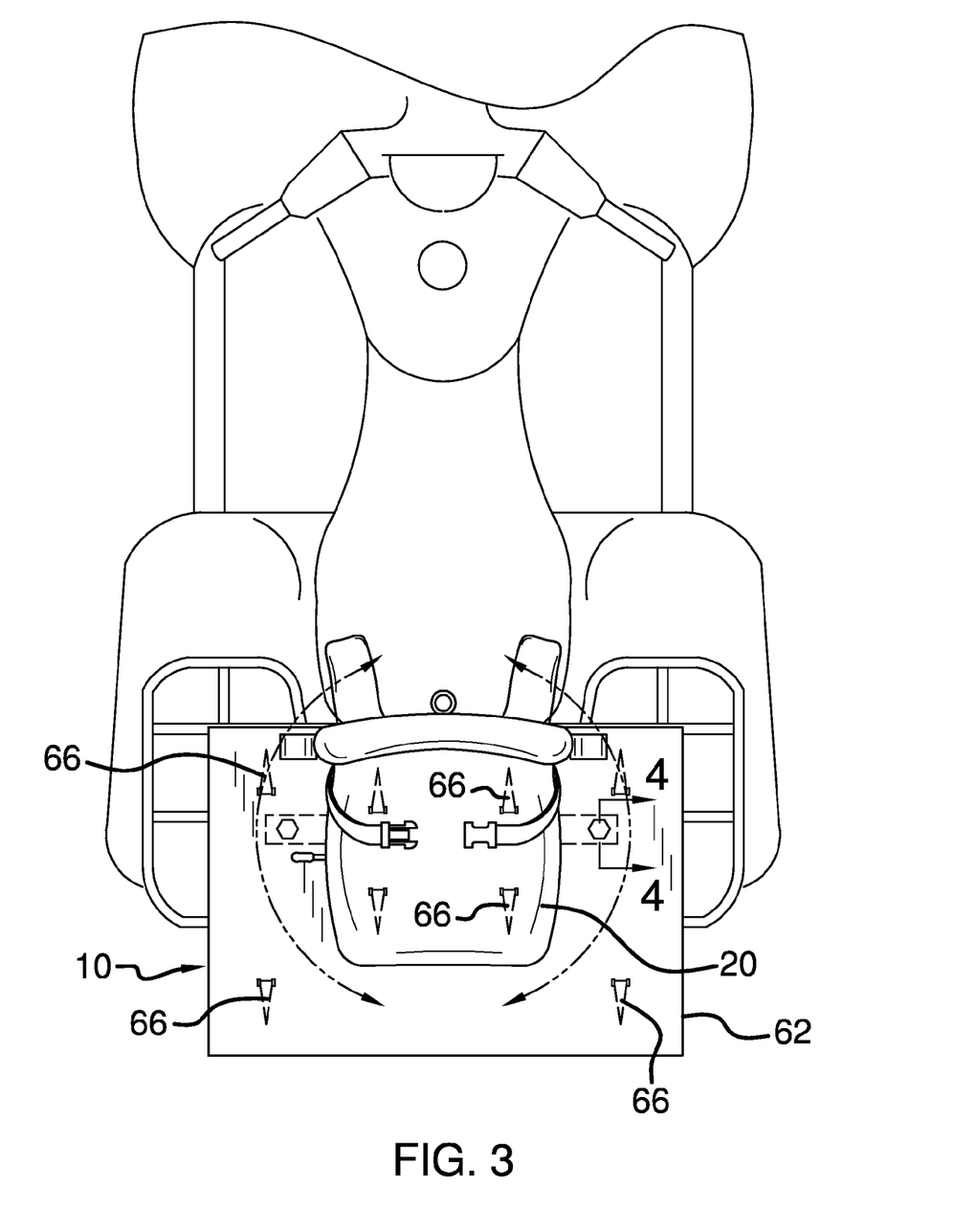
FIG. 3 is an in use top plan view.
Figure 4:
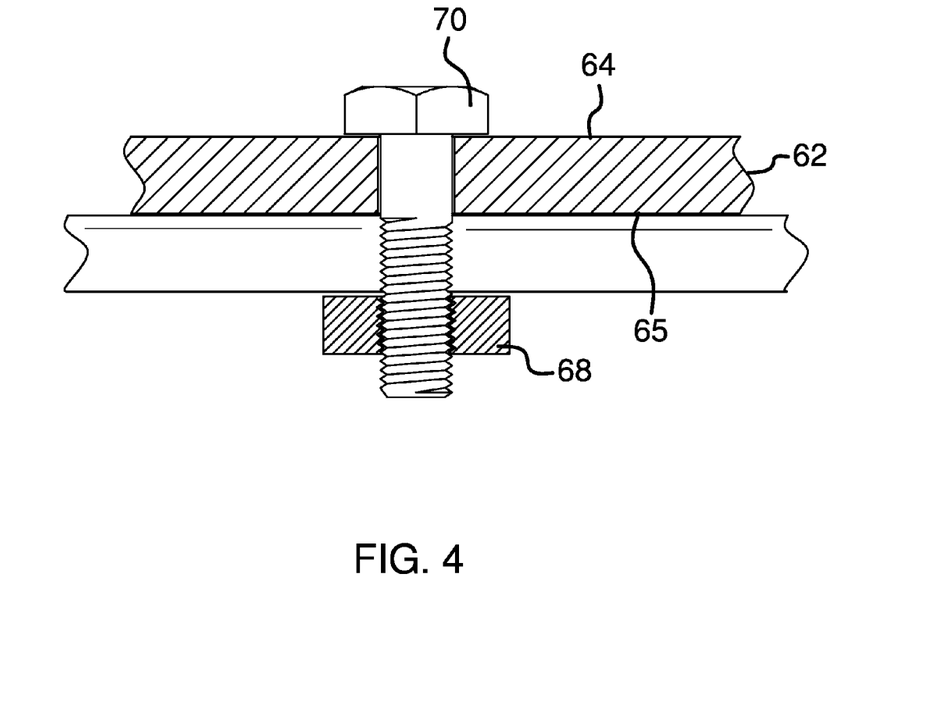
FIG. 4 is a cross sectional in use view of a platform and a threaded retainer.
Figure 5:
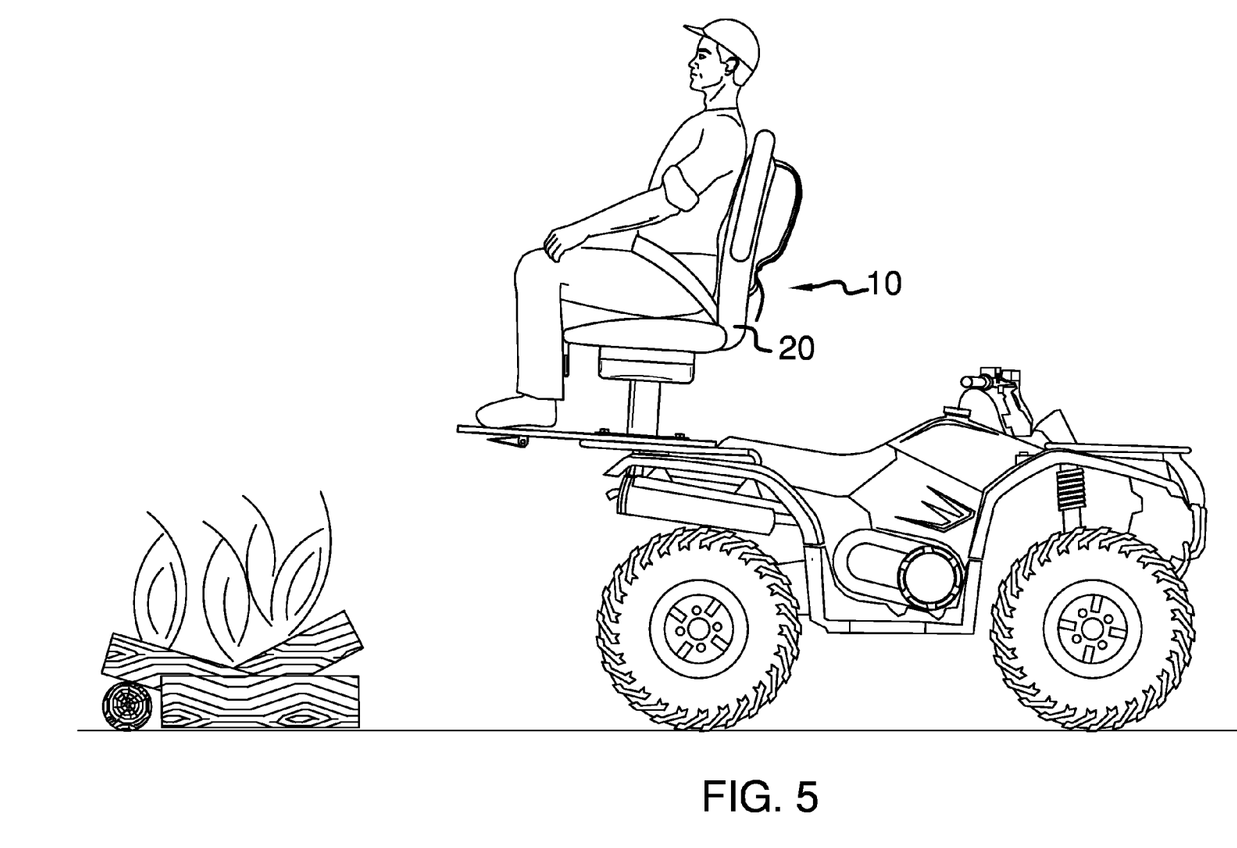
FIG. 5 is an in use view.
Figure 6:
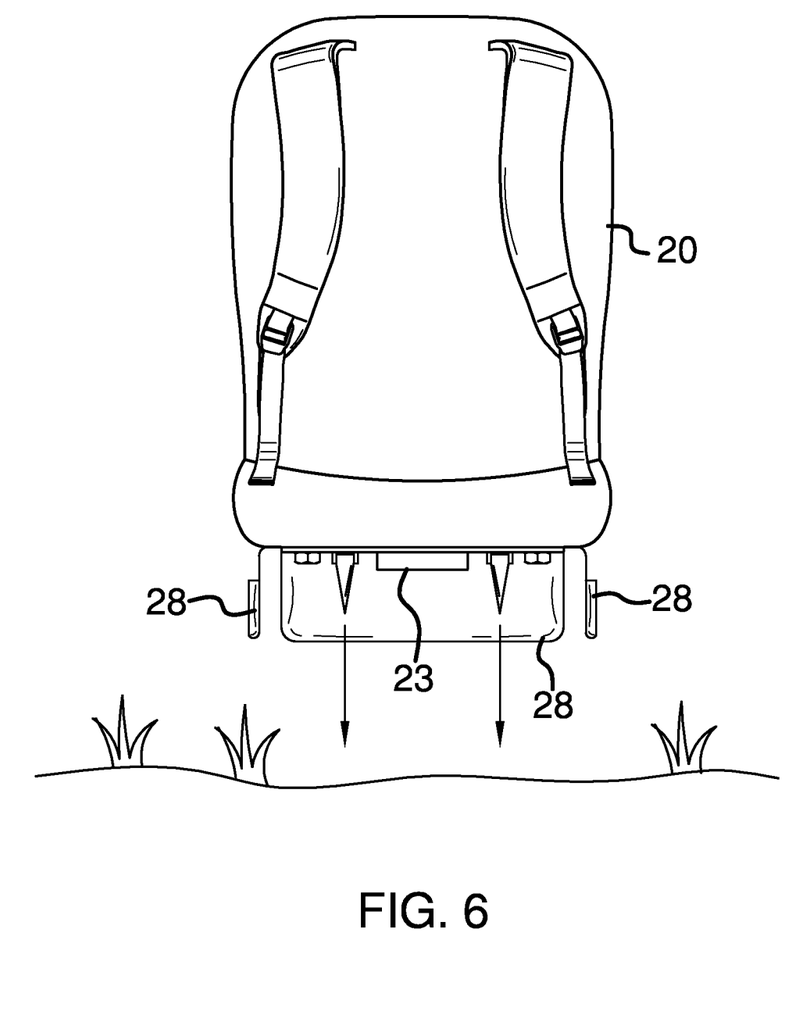
FIG. 6 is a rear elevation view of a chair.
Figure 7:
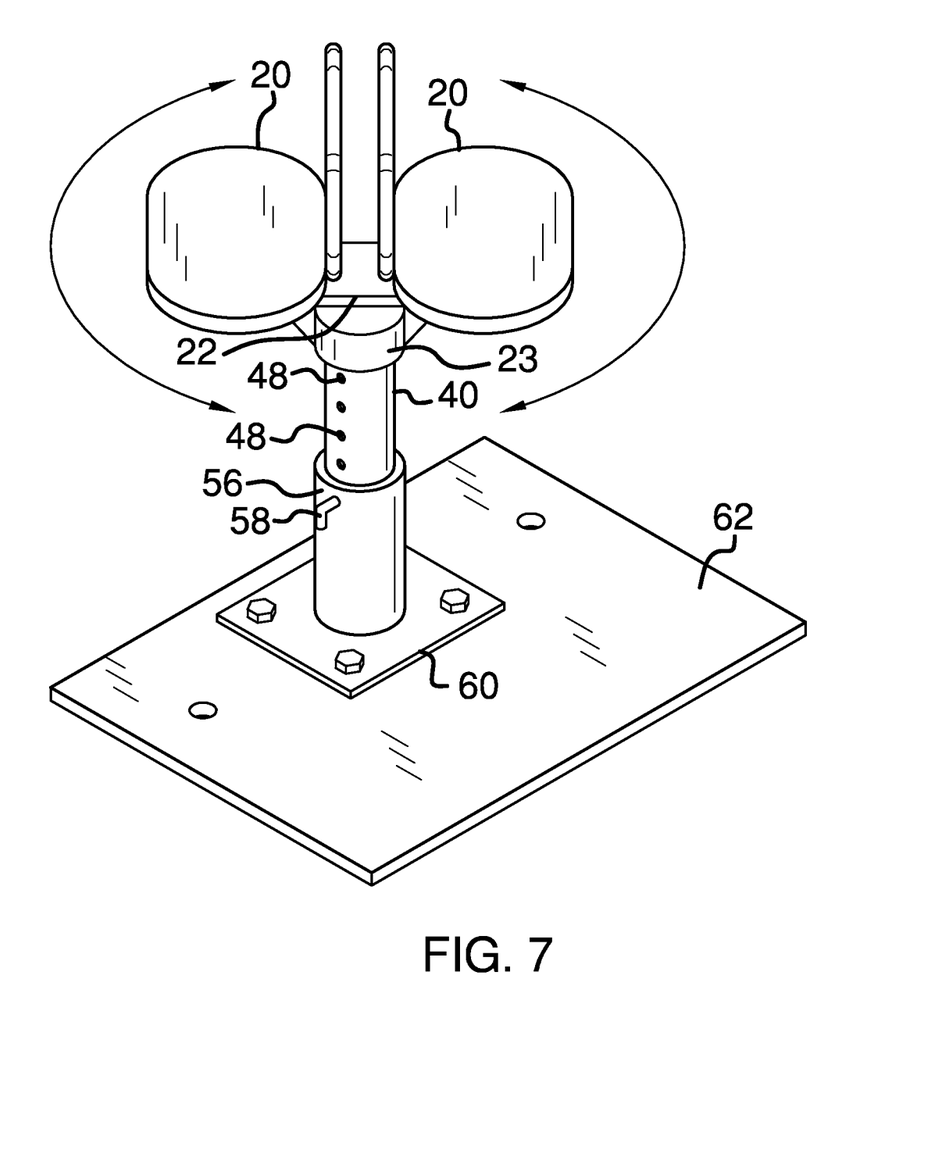
FIG. 7 is a perspective view of two chairs affixed to a receiver.
Figure 8:
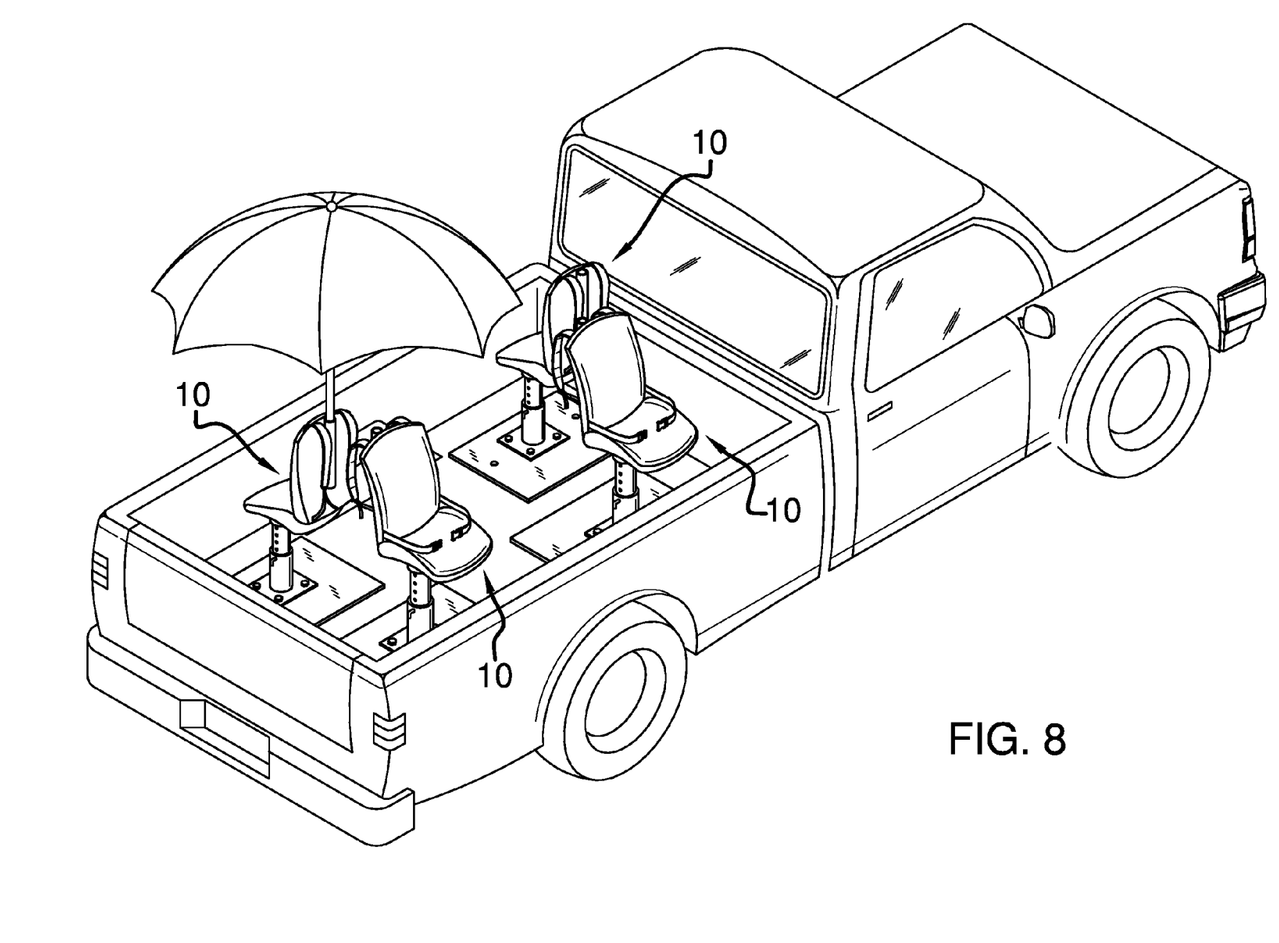
FIG. 8 is an in use view of a plurality of devices.

The device 10 is also provided with two chairs 20 mounted to the receiver 23. The device 10 is selectively mounted to a variety of transport vehicles.

What is claimed is:

1. An electrically swiveled hunter chair device comprising:
a chair;
a base affixed to the chair;
a receiver disposed on the base;
an accessory tube disposed on the chair;
a harness disposed on the chair;
a motor removably disposed on the base;
a drive gear affixed to the motor;
a slave gear slidably disposed on the receiver;
a foot pedal in operational communication with the motor;
an electrical feed connected to the foot pedal;
a cylinder selectively disposed within the receiver;
a plurality of holes disposed in the cylinder;
a tube having a first end spaced apart from a second end, the first end in slidable receipt of the cylinder;
a plurality of foramen disposed within the tube;
a pin selectively securing the cylinder within the tube via the holes and the foramen;
a mount disposed on the second end;
a platform having a top side spaced apart from a bottom side, the top side affixed to the mount;
a plurality of folding spikes affixed to the bottom side;
a threaded retainer; and
a plurality of fasteners passed through the platform and into the threaded retainer;
wherein an existing object is selectively disposed between the platform and the threaded retainer in selectively fastening the device to the object.

2. An electrically swiveled hunter chair device comprising:
at least one chair;
a base affixed to the chair;
a receiver disposed on the base;
a pair of folding armrests disposed on the chair;
an accessory tube disposed on the chair;
a plurality of pouches disposed on the chair;
a harness disposed on the chair;
a plurality of folding spikes disposed on the base;
a motor selectively disposed on the base;
a drive gear affixed to the motor;
a slave gear selectively disposed on the receiver;
a bidirectional foot pedal in operational communication with the motor;
an electrical feed connected to the foot pedal;
a cylinder selectively disposed within the receiver;
a plurality of holes disposed in the cylinder;
a tube having a first end spaced apart from a second end, the first end in slidable receipt of the cylinder;
a plurality of foramen disposed within the tube;
a pin selectively securing the cylinder within the tube via the holes and the foramen;
a mount disposed on the second end;
a platform having a top side spaced apart from a bottom side, the top side affixed to the mount;
a plurality of folding spikes affixed to the bottom side;
a threaded retainer; and
a plurality of fasteners passed through the platform and into the threaded retainer;
wherein an existing object is selectively disposed between the platform and the threaded retainer in selectively fastening the device to the object.

* * * * *